United States Patent [19]

Posenaer

[11] Patent Number: 5,452,557
[45] Date of Patent: Sep. 26, 1995

[54] ALUMINUM FRAMING

[75] Inventor: Raymond A. D. Posenaer, Valley Center, Calif.

[73] Assignee: ALUMber LLC, San Diego, Calif.

[21] Appl. No.: 152,282

[22] Filed: Nov. 12, 1993

[51] Int. Cl.⁶ .................................................. E04C 3/06
[52] U.S. Cl. ...................... 52/731.7; 52/731.8; 52/731.9; 403/403; 411/453
[58] Field of Search ............................. 52/731.7, 731.8, 52/731.9, 690, 656.6, 481.1, 281; 411/456, 437, 453, 454; 403/403

[56] References Cited

U.S. PATENT DOCUMENTS

| | | |
|---|---|---|
| D. 237,264 | 10/1975 | Edwards. |
| D. 242,626 | 12/1976 | Scrivener. |
| D. 250,847 | 1/1979 | Lemieux. |
| D. 253,552 | 11/1979 | Durbin. |
| D. 272,711 | 2/1984 | Griset. |
| 276,541 | 4/1883 | Sloan ................................. 411/453 |
| D. 318,130 | 7/1991 | Abbestam et al.. |
| 2,020,062 | 11/1935 | Jackson ............................. 411/456 x |
| 2,457,250 | 12/1948 | Macomber ...................... 52/731.7 X |
| 2,633,945 | 4/1953 | Millier ............................. 52/731.9 X |
| 2,736,403 | 2/1956 | Gwyune ........................... 52/656.6 X |
| 2,913,076 | 11/1959 | Marks. |
| 3,066,774 | 12/1962 | Dahme ............................. 52/731.9 X |
| 3,129,792 | 4/1964 | Gwynne. |
| 3,243,930 | 4/1966 | Slowinski ....................... 52/731.9 X |
| 3,566,561 | 3/1971 | Tozer. |
| 3,866,364 | 2/1975 | Pollard. |
| 4,033,544 | 7/1977 | Johnston. |
| 4,619,098 | 10/1986 | Taylor. |
| 4,793,113 | 12/1988 | Bodnar. |
| 5,233,807 | 8/1993 | Spera. |

Primary Examiner—Carl D. Friedman
Assistant Examiner—Christopher Todel Kent
Attorney, Agent, or Firm—Christie, Parker & Hale

[57] ABSTRACT

A framing member having first and second opposed inner flanges connected by a substantially flat web. The framing member further has first and second opposed outer flanges located outboard of the first and second inner flanges, respectively and centrally connected to the first and second inward flanges by first and second secondary webs. An object may be secured to the framing member by driving a nail through the object and into a channel formed between a pair of the inner and outer flanges so that the nail shaft forcibly contacts and is held securely by both flanges.

16 Claims, 4 Drawing Sheets

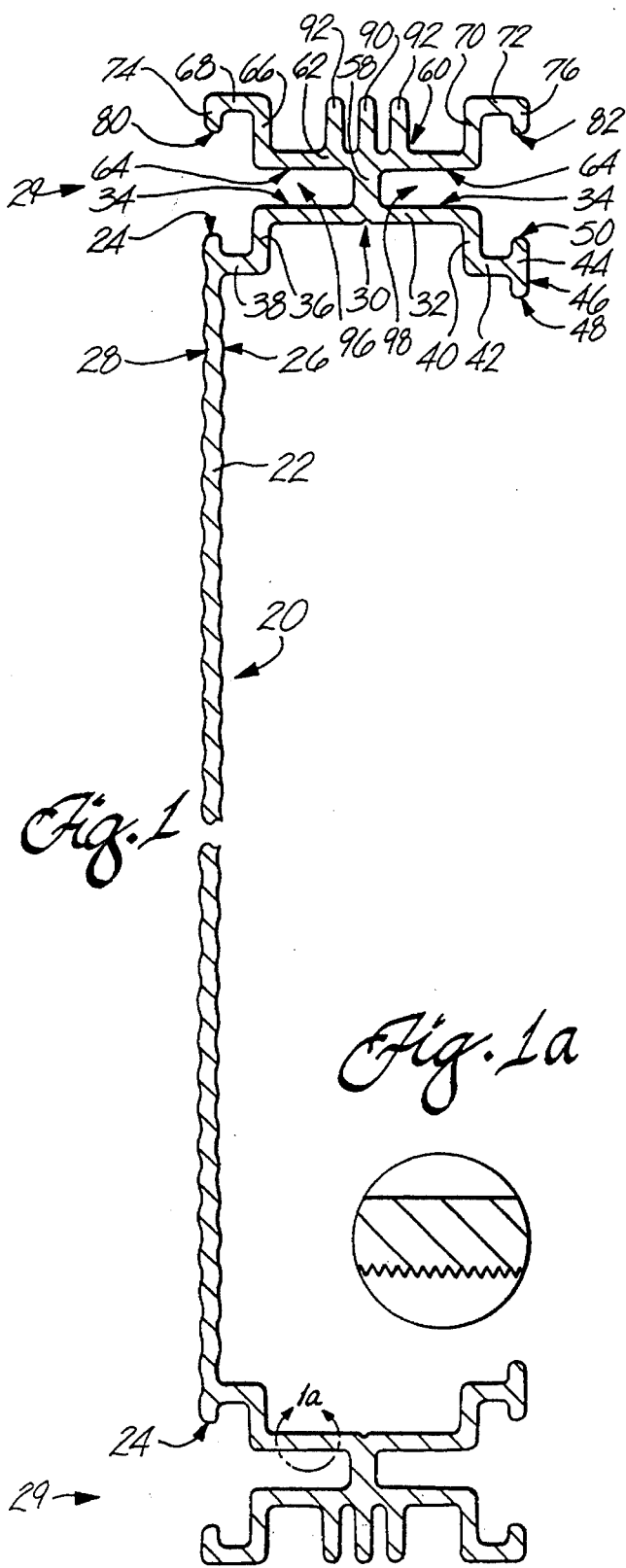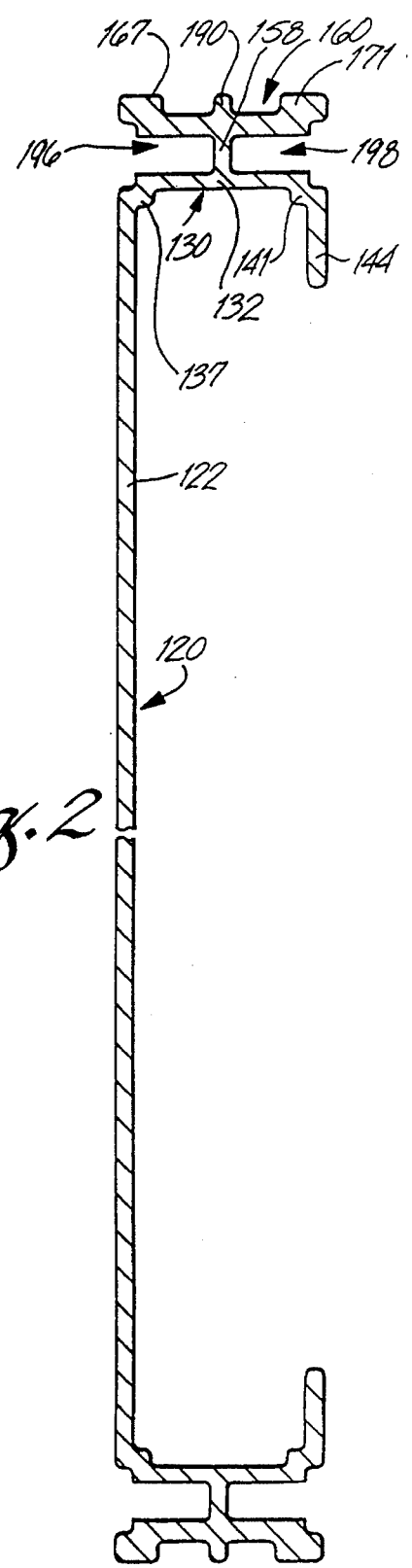

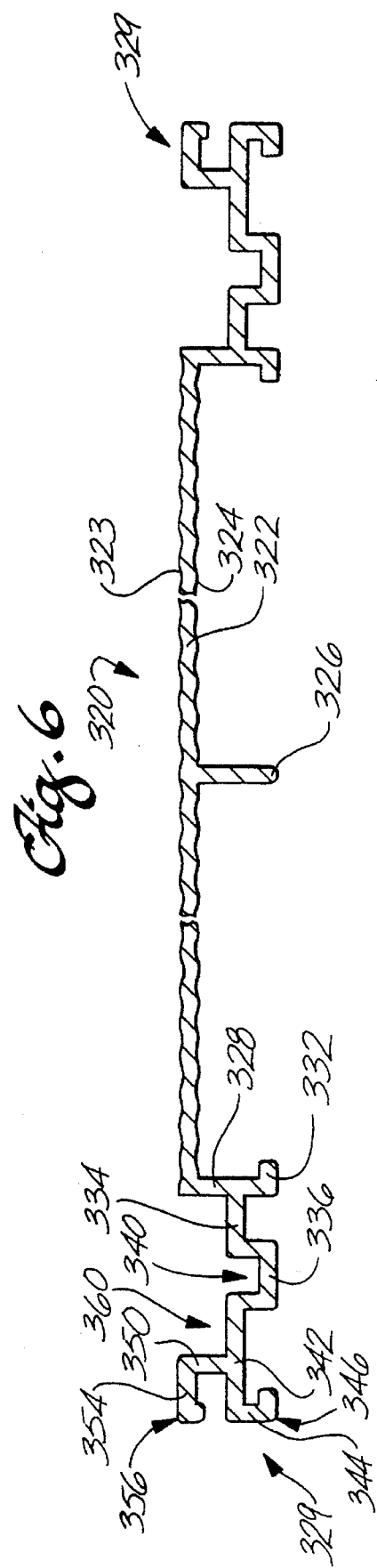

ALUMINUM FRAMING

BACKGROUND OF THE INVENTION

The invention pertains to structural materials. More particularly, it pertains to aluminum framing which may be formed by extrusion and may be sawed and nailed for construction or for manufacture of pallets in place of dimensional lumber.

Traditionally, framing for homes and the like, and pallets for materials handling have been made of wooden lumber. There are many varieties of metal framing materials which have been suggested or put into actual use. Such framing is typically formed of extruded aluminum or rolled steel and individual frame members may be secured to each other by use of a combination of clips, hangers, nuts/bolts and other hardware. Accordingly, use of such framing involves techniques which are dissimilar to standard wood framing construction techniques and more time-consuming. In particular, it would be advantageous that the frame members could be secured to each other or to other objects using standard nail guns.

There is accordingly a need for metal framing which may be used in place of dimensional lumber and is nailable.

BRIEF SUMMARY OF THE INVENTION

Thus, there is provided in practice of this invention according to a presently preferred embodiment a framing member having first and second opposed inner flanges connected by a substantially flat principal web and first and second opposed outer flanges located outboard of the first and second inner flanges, respectively, and centrally connected to the first and second inner flanges by first and second secondary webs. An object may be secured to the framing member by driving a nail through the object and into a channel formed between a pair of the inner and outer flanges so that the nail shaft forcibly contacts and is held securely by both flanges. Nails may also be driven through the web for tight engagement.

BRIEF DESCRIPTION OF THE DRAWINGS

These and other features and advantages of the present invention will be appreciated as the same becomes understood by reference to the following detailed description, when considered in connection with the accompanying drawings wherein:

FIG. 1 is a broken transverse cross-sectional view of a first embodiment of an aluminum framing member according to principles of the present invention;

FIG. 2 is a broken transverse cross-sectional view of a second embodiment of an aluminum framing member according to principles of the present invention;

FIG. 6 is a broken transverse cross-sectional view of a fourth embodiment of an aluminum framing member according to principles of the present invention.

DETAILED DESCRIPTION

Figure 3:
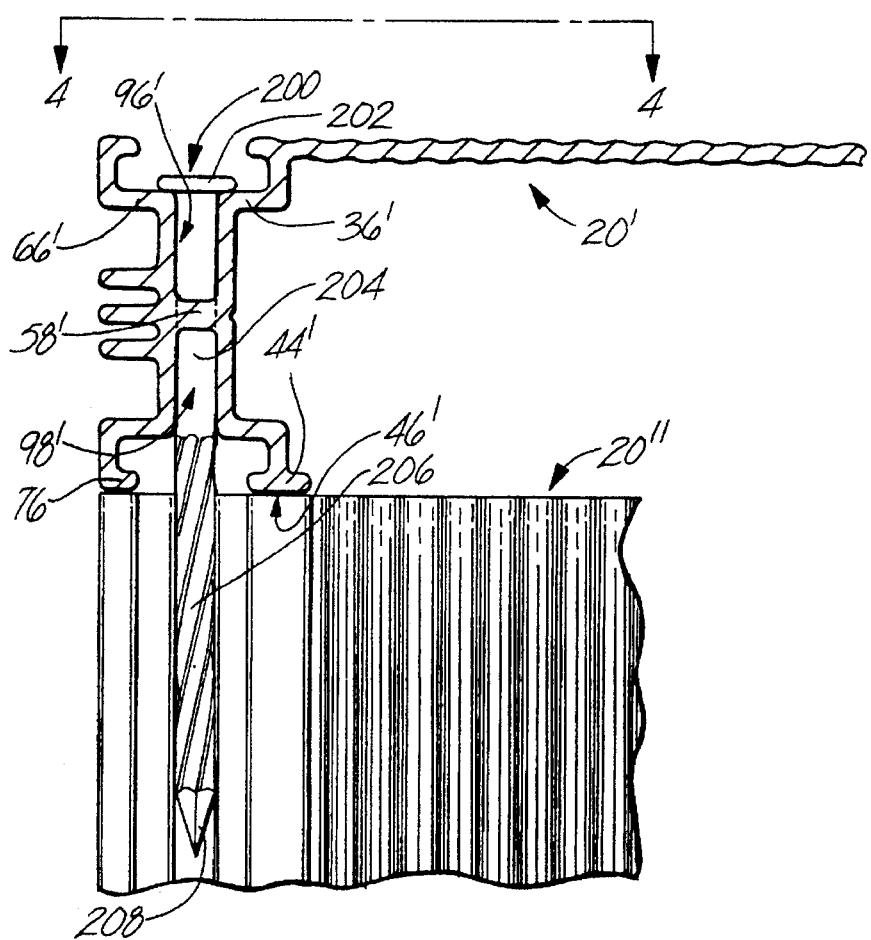
FIG. 3 is a view of a nailed joint between first and second aluminum framing members according to the first embodiment of the invention with a first framing member shown in cross-section.

Terms such as vertical (upper/lower) and horizontal (left/right) are used herein to describe the various embodiments of aluminum framing when viewed in the orientations shown in the drawings. Such language is used merely to help describe the relative orientations of the various portions of the framing members. The framing members may assume an infinite variety of orientations.

An exemplary aluminum extrusion framing member or beam 20 has a generally U-shaped transverse cross-section, as illustrated in FIG. 1. The framing member has a generally flat principal web 22 extending between substantially identical interconnection portions 29 along each edge 24 of the principal web. The two faces of the principal web are provided with a ripple contour to help give the framing member an ornamental appearance. The interconnection portions form the parts of the framing member principally used for nailing adjacent members together or for nailing other objects to the framing member.

The principal web could be more or less centered relative to the interconnection portions, but there are advantages to the asymmetry of this embodiment for placing electrical and plumbing connections, or the like, in the framing of a house, or the like.

Each of the interconnection portions is itself substantially symmetrical across a vertical plane at the center of the thickness of the framing member. Thus, each interconnection portion has a pair of T-shaped channels 96 and 98 extending along the length the framing member and each of the T-shaped channels has the cross-arm of the T open to one face of the framing member. The leg of each T-shaped channel extends toward the center plane of the framing member and the bottom of each leg is separated from the bottom of the other leg by a secondary web 58. The opposing inner faces 34 and 64 defining the leg of each T-shaped channel provide the surfaces which nails bear against and engage when adjacent framing members are nailed together.

Specifically, each of the interconnection portions has an inner flange 30 perpendicular to the principal web of the framing member. The inner flanges are generally parallel to each other at opposite ends of the principal web. Each inner flange has a central portion 32 with an outwardly facing nailing surface 34.

Each inner flange has a left L-shaped shoulder portion with a vertical section 36 connected to the central portion of the flange and extending perpendicular thereto. In other words, the vertical section at the edge of the inner flange extends toward the interconnection portion at the opposite end of the principal web. A horizontal section 38 of the L-shaped shoulder extends from the end of the vertical section 36 to join the inboard surface of the principal web.

In the illustrated embodiment, the horizontal sections 38 connect to the inboard surface of the principal web substantially adjacent to but slightly recessed from the principal web edges 24.

Formed as horizontal mirror images of the left shoulder portions of the inner flanges, the flanges each have a right shoulder portion. Each right shoulder portion has a vertical section 40 connecting to that flange's central portion and extending perpendicular thereto and a horizontal section 42 extending horizontally outward from the end of the vertical section to join a flat elongated foot portion 44.

These foot portions 44 each have an outboard (right) surface 46 parallel to and horizontally opposite from the outboard (left) surface of the principal web of the framing member. The foot portions each have vertically inboard edges 48 and vertically outboard edges 50. The vertically outboard edges 50 are horizontally opposite from the edges 24 of the principal web.

A secondary web 58 connects the inner flange to an outer flange 60 at each interconnection portion of the framing member. The outer flange is parallel to the inner flange. The secondary web is in the center of the inner and outer flanges. The secondary web separates the legs of the T-shaped channels. Each outer flange has a central portion 62 with an inwardly facing nailing surface 64 parallel to and spaced apart from the nailing surface 34 of the inner flange.

Each outer flange has left and right shoulder portions formed substantially as vertically outboard mirror images of the left and right shoulder portions of each inner flange. Each of the left and right shoulder portions have a vertical section 66 and 70, respectively, connecting to the flange's central portion and extending perpendicular thereto. The left and right shoulder portions each have a horizontal section 68 and 72, respectively, connecting and extending perpendicular to both the first section and a flat elongated corner portion 74 and 76, respectively. Accordingly, corresponding horizontal shoulder sections 68 and 72 and the elongated corner portions 74 and 76 form the four corners of the beam.

Each elongated corner portion has an inboard edge. Such inboard edges 80 of the left elongated corner portions 74 are vertically outboard of and opposed to the edges 24 of the web. Similarly, inboard edges 82 of the right elongated corner portions 76 are vertically outboard of and opposed to the vertically outboard edges 50 of the elongated foot portions 44.

A central rib 90 extends vertically outward from the outer flange 60 and is aligned with the secondary web 58 which separates the T-shaped channels. On either side of each central rib 90 is an outboard rib 92 of similar form and extending parallel to the central rib.

Thus, in each interconnection portion, a pair of T-shaped channels 96 and 98 are formed by the secondary webs, the nailing surfaces and the L-shaped shoulder portions. Each T-shaped channel has a leg pointing toward the leg of the other T and a cross-arm portion that opens toward the opposite faces of the framing member.

The leg channel portions have parallel side walls formed by the vertically outward and inward facing nailing surfaces of the outer and inner flanges. The leg channel portions are also fully open at their horizontally outboard ends where they join the cross-arm channel portions.

The channel width of the leg channel portions is chosen to be slightly narrower than the diameter of a preselected size of nail so that the nail may be driven into the channel and forcibly engaged by the channel walls to secure the nail in place. To this end, the surfaces of the channel walls may be roughened, serrated or provided with other contour to more securely grip the nail. Furthermore, the cross-arm portion and opening of each T-shaped channel is sized so that the head of a nail will pass through the opening and be accommodated by the cross-arm portion when the nail is driven through the secondary web so as to extend through both channels of a channel pair.

The principal web 22 in the embodiment in FIG. 1 is illustrated broken to indicate indefinite length. The approximate dimensions of the illustrated cross section correspond to those of "two by six" (2×6) dimensional lumber. Different length webs can make the framing member correspond to a conventional 2×2, 2×4, 2×8, etc. Two such framing members can be nailed side by side to make a thicker beam. For example, two 2×4 framing members can be nailed face to face for forming a 4×4.

An exemplary joint between adjacent framing members is where the horizontal plate for a wall is nailed to the top of a vertical stud. Such a joint can be seen in FIGS. 3 and 4 where a plate 20' is placed on top of a stud 20". This view is transverse to a wall where one sees a face of the stud and transverse cross-section of the plate. The plate 20' and its elements are designated with the superscript ' and the stud 20" and its elements are designated with the superscript " with like numerals designating like elements as recited above.

The interconnection portion along an edge of the plate is located directly over an interconnection portion of the stud. The other interconnection portions of the plate and stud are also opposite each other, but are not illustrated in FIGS. 3 and 4. A nail is driven through the upper T-shaped channel of the plate, passes through the secondary web between the T-shaped channels, passes through the lower channel of the plate and enters the end of one of the T-shaped nailing channels in the interconnection portion of the stud. The nail is preferably a standard screw nail 200 driven by a nail gun (not shown). The nail has a flat circular head 202 and a shaft having a cylindrical section 204 extending from the lower surface of the head and a low-pitch threaded section 206 extending from the cylindrical section 204 to a pointed tip 208. In the illustrated embodiment, the screw nail is approximately 2⅜ inches (6 cm) long, the cylindrical section is 0.148 inches (0.375 cm) in diameter and the threaded section is 0.164 inches (0.417 cm) in diameter. The threading is approximately 3.4 threads per inch (1.4 per cm). The leg portions of the channels are 0.143 inches (0.363 cm) in width.

A central rib 90, groove or other marker extending along the length of the stud indicates where the secondary web between the T-shaped channels of the stud is located. When the nail is driven, the nail gun is approximately centered relative to the rib and the nail is driven through the plate and into the end of the stud. It is found that even if the nail seems to be exactly aligned with the secondary web in the stud, it is deflected slightly to one side or the other and enters a nailing channel of the stud.

In the illustrated orientation, the centers of the pair of channels of the plate are coplanar with those of the stud. The outboard surface of a flat elongated corner portion 76' of the plate contacts the end of the stud along its elongated corner portions 74" and 76", outer flange shoulder portions 66", 68", 70", and 72" and central and outboard ribs 90" and 92". Similarly, the outboard surface 46' and foot portion 44' of the plate contact the stud 20" along its principal web 22" (adjacent its edge 24"), inner shoulder portions 36", 38", 40", and 42" and elongated foot portion 40".

Figure 4:
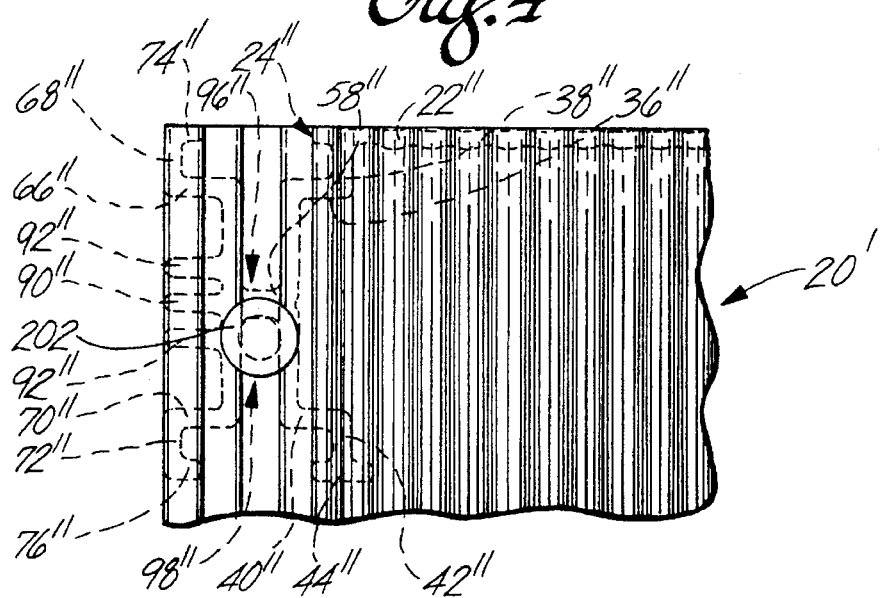
FIG. 4 is a top elevational view of the joint of FIG. 3 with the second framing member shown hidden.

As shown in FIG. 3, the nail 200 is driven through the plate's channel 96', puncturing the secondary web 58' and then through the channel 98' and then longitudinally into one of the channels 96" or 98" of the stud. In FIG. 4, the nail is shown driven into channel 98". The channel 98" securely engages the threaded portion 206 of the nail. The head 202 of the nail rests against the shoulder portions 66' and 36' of the plate 20' adjacent the opening of the T-shaped channel 96'.

Although it is possible to use a hammer to drive the nail, a nail gun has specific advantages in that it is able to recess the nail head within the cross-arm portion of the T-shaped channel. Also, the single smooth stroke of a nail gun may do less damage to the channel walls which engage the nail and thus provides a stronger joint. The nail gun used to drive the nail screw may be electric, pneumatic or charge driven.

A second embodiment of an aluminum framing member is shown in FIG. 2 wherein features similar to features of the first embodiment are referenced with like numerals plus 100. For example, the principal web of the first embodiment is 22 and the web in the second embodiment is 122. In this embodiment, the left and right shoulder portions 137 and 141 of the inner flanges 130 do not have separate sections perpendicular to each other but rather form projecting beads or fillets connecting the central portions 132 to the web and to elongated foot portions 144, respectively. The connections between the inner flanges and the principal web are not recessed relative to the web edges. The shoulder portions connect to the inboard surface of the principal web and the elongated foot portions adjacent the vertically outboard edges of the web and foot portions so that the nailing surface of the central portion of each inner flange is vertically outboard of the adjacent web and foot portion edges.

Similarly, the left and right shoulder portions 167 and 171 of the outer flanges 160 do not have separate first and second sections, but are formed as simple corner portions of the framing member. The pairs of T-shaped channels 196 and 198 are, similarly to those of the first embodiment, dimensioned to securely engage a nail shaft. However, in this embodiment, the cross-arm portion of each T-shaped channel is smaller than in the first embodiment, sized to more closely receive a nail head, and thus is fully open.

Figure 5:
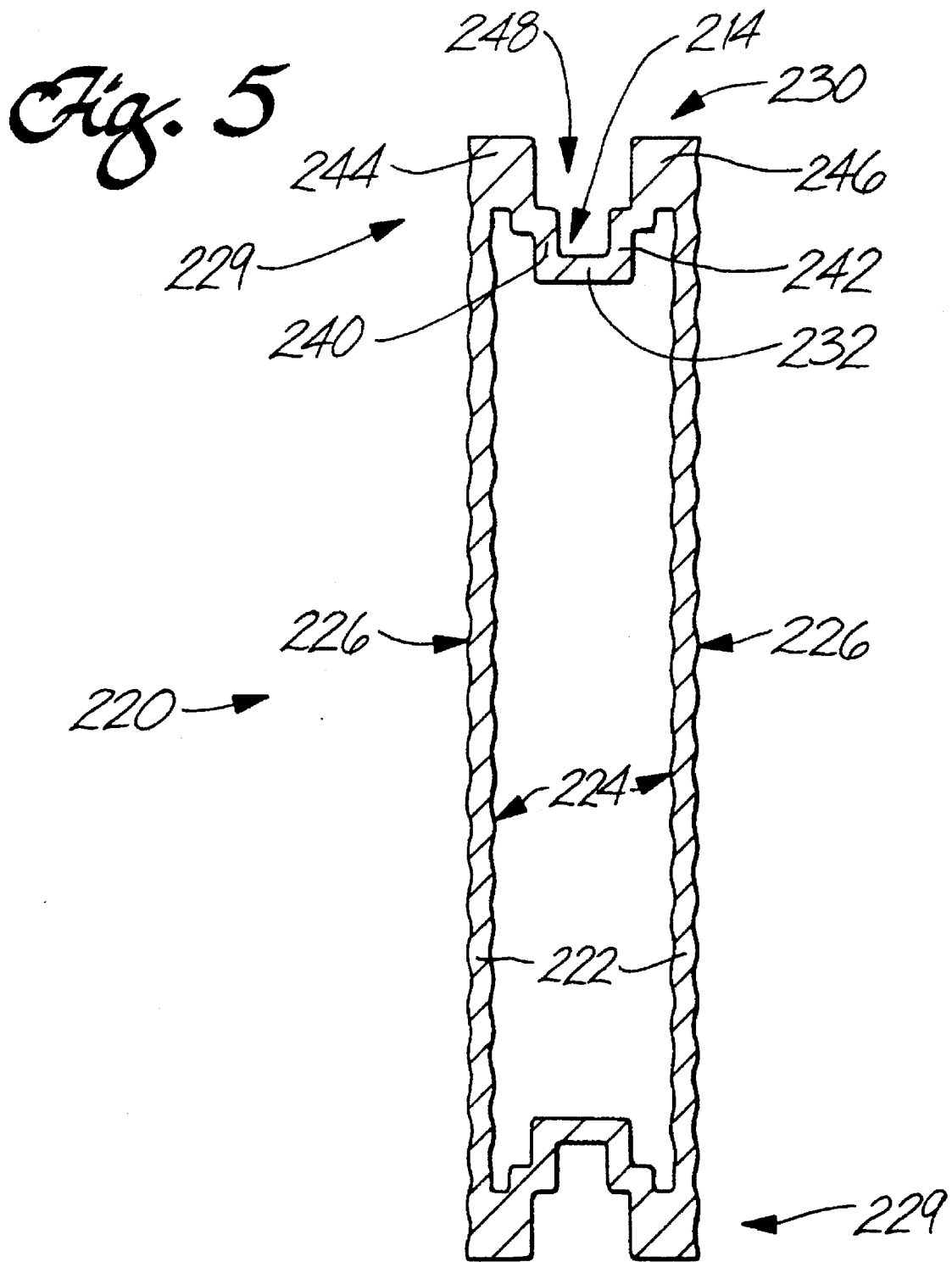
FIG. 5 is a transverse cross-sectional view of a third embodiment of an aluminum framing member according to principles of the present invention.

As shown in FIG. 5, a third embodiment of an aluminum framing member 210 is designed to receive nails vertically into the framing member through upper and lower vertically outwardly facing channels 214. The framing member has left and right parallel and horizontally opposed webs 222. The left and right webs have inboard surfaces 224 and outboard surfaces 226.

Flanges 230 connect the left and right webs at their upper and lower edges. The vertically inboardmost portion of each flange is a central horizontally extending wall 232. Extending vertically outward from the left edge of each wall 232 is an L-shaped wall 240. Similarly, extending vertically outward from the right edge of each wall 232 is an L-shaped wall 242. The heads of the L-shaped walls connect to the central horizontal walls and the bases of the L-shaped walls point horizontally outward and connect to substantially rectilinear framing corner portions 244 and 246 formed at the upper and lower edges of the respective left and right webs. The flanges define T-shaped channels 248. The leg portions of the T-shaped channels are right channels formed by the L-shaped walls and the horizontal central walls and are open vertically outwardly. The width of these channels is chosen to securely receive a screw nail.

As shown in FIG. 6, a fourth embodiment of an aluminum framing member 320 is designed to be used in planking applications such as where the member is placed flat atop and nailed to a number of joists. The framing member has left and right interconnection portions 329 which are symmetric about a central vertical plane. Along its top, the beam has a horizontal central web 322 with outboard (upper) and inboard (lower) surfaces 323 and 324, respectively. A flat central reinforcement rib 326 extends downwardly from the lower surface of the central web. Each interconnection portion has a flange 328 extending downwardly from an edge of the central web. At the lower edge of each flange, a foot portion 332 extends horizontally inward parallel to the central web. Extending horizontally outward from outer surfaces of each flange is a flat secondary web 334. The horizontally outboard edge of the each secondary web connects to a channel portions 336 defining a vertically oriented and upwardly facing right open channel 340. A tertiary web 342 extends horizontally outward from the channel portion. An L-shaped wall 344 extends downward from the outboard edge of each tertiary web. The vertex 346 of each L-shaped wall 344 forms a lower corner of the beam. Extending vertically upward from the upper surface of each tertiary web portion is a short vertical wall 350. Extending horizontally outward from the end of the short vertical wall is an L-shaped wall portion 354. The vertex 356 of each L-shaped wall portion 354 forms an upper corner of the beam.

It can be seen that the respectively left and right short vertical walls, tertiary webs, channel portions, secondary webs, and flanges form T-shaped channels 360, the leg portions of which are formed by the channels 340. In the manner described with respect to the other embodiments, the channels 340 are dimensioned to engage a desired size of screw nail. When a screw nail (not shown) is driven through a channel portion 336 its head is appropriately accommodated in the cross-arm portion of the T-shaped channel resting on the secondary and tertiary web portions while the shaft is gripped by the side walls of the channel portion.

Framing members of the fourth embodiment may be nailed across members of the third embodiment to create, for example, pallets for materials handling.

While preferred embodiments of aluminum framing have been described and illustrated herein, other constructions will be apparent to those skilled in the art. It is therefore to be understood that, within the scope of the appended claims, the invention may be practiced otherwise than specifically described.

What is claimed is:

1. A combination of an extruded aluminum framing member having edges, and a nail wherein the framing member comprises:

a pair of interconnection portions extending along each edge of the framing member;

a substantially flat web extending between the interconnection portions;

a pair of generally T-shaped channels in each interconnection portion, each T-shaped channel having a cross-arm portion opening external to the framing member and a leg portion extending toward the leg portion of the other T-shaped channel for receiving a nail; and a nailing web separating the ends of the adjacent leg portions from each other the width of each leg portion being less than the diameter of the nail.

2. A combination as recited in claim 1 wherein the flat web is asymmetrically connected to the interconnection portions so that the framing member has a generally U-shaped transverse cross section.

3. A combination as recited in claim 1 wherein each side wall of the leg portion of a channel is serrated for engaging the surface of the nail.

4. A combination as recited in claim 1 wherein the mouth of the T-shaped channel is sufficiently wide to accommodate the head of the nail.

5. A combination as recited in claim 1 wherein the nail is a screw nail.

6. A nailed joint between adjacent framing members, the joint comprising:
- a first elongated extruded aluminum framing member having edges, an interconnection portion along each edge and at least one nailing channel extending along the length of the member;
- a second elongated extruded aluminum framing member having an interconnection portion along each edge and at least one nailing channel extending along the length of the member, the second elongated framing member being positioned transverse to the first elongated framing member, at least one of the interconnection portions of the first framing member being adjacent to one of the interconnection portions of the other framing member; and
- a nail extending through a nailing channel in an interconnection portion of the first framing member and into a nailing channel in an interconnection portion of the second framing member, the nail having a diameter larger than the width of the nailing channels.

7. A nailed joint between adjacent framing members, the joint comprising:
- a first elongated extruded aluminum framing member having edges, an interconnection portion along each edge and a nailing channel;
- a second elongated extruded aluminum framing member having an interconnection portion along each edge and a nailing channel, the second elongated framing member being positioned transverse to the first elongated framing member, at least one of the interconnection portions of the first framing member being adjacent to one of the interconnection portions of the other framing member; and
- a nail extending through a nailing channel in an interconnection portion of the first framing member and into a nailing channel in an interconnection portion of the second framing member, the nail having a diameter larger than the width of the nailing channels; and wherein
- each nailing channel comprises the leg of a generally T-shaped channel extending along the length of the respective framing member, the head of the nail engaging the cross-arm of a T-shaped channel at the top of the leg.

8. A joint as recited in claim 7 wherein said T-shaped channels are first T-shaped channels and wherein each framing member comprises a second T-shaped channel.

9. A joint as recited in claim 8 wherein the first and second T-shaped channels of each framing member are separated by a web.

10. A joint as recited in claim 6 wherein the first and second framing members are perpendicular to each other and the nail shaft extends longitudinally into a nailing channel in the interconnection portion of the second framing member.

11. A joint as recited in claim 6 wherein each framing member is generally U-shaped.

12. A joint as recited in claim 6 wherein parallel surfaces of each nailing channel are serrated.

13. A joint as recited in claim 6 wherein at least one of the aluminum framing members comprises means for sighting a nail gun to drive the nail.

14. An elongated beam comprising:
- first and second inner flanges, generally opposed and extending the entire length of the beam, the first and second inner flanges each having a central portion with a flat outward facing surface;
- a substantially flat web connecting the first and second inner flanges and extending the entire length of the beam;
- first and second outer flanges, generally opposed, located outboard said first and second inner flanges, respectively, and extending the entire length of the beam, the first and second outer flanges each have a central portion with a flat inward facing surface parallel to said outward facing surface; and
- first and second secondary webs centrally connecting the first inner and outer flanges and second inner and outer flanges, respectively, and extending the entire length of the beam, said outward and inward facing surfaces and said secondary webs forming first and second pairs of opposed open channels; and wherein
- each of the first and second inner flanges has a shoulder portion having a first section connecting to the central portion of the inner flange and extending transverse thereto and a second section connecting and extending transverse to the first section and the web.

15. The beam of claim 14 wherein each of the first and second inner flanges has a second shoulder portion having a first section connecting to the central portion of the inner flange and extending transverse thereto and a second section connecting to and extending transverse to the first section.

16. The beam of claim 14 wherein each of the first and second outer flanges has first and second shoulder portions each having a first section connecting to the central portion of the inner flange and extending transverse thereto and a second section connecting to and extending transverse to the first section.

* * * * *